United States Patent
Ovrutsky et al.

(10) Patent No.: US 9,030,745 B2
(45) Date of Patent: May 12, 2015

(54) WAFER LEVEL OPTICAL ELEMENTS AND APPLICATIONS THEREOF

(71) Applicants: David Ovrutsky, Charlotte, NC (US); Jeremy Huddleston, Concord, NC (US)

(72) Inventors: David Ovrutsky, Charlotte, NC (US); Jeremy Huddleston, Concord, NC (US)

(73) Assignee: Nan Chang O-Film Optoelectronics Technology Ltd, Nanchang (CN)

( * ) Notice: Subject to any disclaimer, the term of this patent is extended or adjusted under 35 U.S.C. 154(b) by 0 days.

(21) Appl. No.: 13/863,906

(22) Filed: Apr. 16, 2013

(65) Prior Publication Data
US 2013/0229719 A1 Sep. 5, 2013

Related U.S. Application Data (63) Continuation of application No. 12/497,441, filed on Jul. 2, 2009, now Pat. No. 8,422,138.

(51) Int. Cl.
*G02B 27/10* (2006.01)
*G02B 13/00* (2006.01)
*B29D 11/00* (2006.01)
*G02B 3/00* (2006.01)

(52) U.S. Cl.
CPC ...... *G02B 13/0085* (2013.01); *B29D 11/00278* (2013.01); *B29D 11/00365* (2013.01); *G02B 3/0031* (2013.01)

(58) Field of Classification Search
CPC .. G02B 13/085; G02B 13/003; G02B 13/006; G02B 7/003; G02B 3/0062; H01L 27/14685; H01L 27/14687; H01L 27/14627
USPC ................... 359/619–624, 628, 740
See application file for complete search history.

(56) References Cited

U.S. PATENT DOCUMENTS

| | | | |
|---|---|---|---|
| 6,124,974 A | 9/2000 | Burger | |
| 7,760,445 B2 | 7/2010 | Yu | |
| 8,049,806 B2* | 11/2011 | Feldman et al. | 359/619 |
| 2005/0128597 A1* | 6/2005 | Amanai | 359/621 |
| 2006/0292735 A1* | 12/2006 | Boettiger et al. | 359/619 |

(Continued)

FOREIGN PATENT DOCUMENTS

| | | |
|---|---|---|
| CN | 101276042 A | 10/2008 |
| CN | 101354447 A | 1/2009 |
| EP | 1 070 972 A2 | 1/2001 |
| WO | WO 2009/048320 A1 | 4/2009 |

OTHER PUBLICATIONS

Chinese Office action dated Jan. 23, 2014 for CN 201080030316.5, David Ovrutsky, et al.

(Continued)

*Primary Examiner* — Alicia M Harrington
(74) *Attorney, Agent, or Firm* — Novak Druce Connolly Bove + Quigg LLP (57) ABSTRACT

A wafer level lens includes a first lens structure of a first polymeric material coupled to a second lens structure of a second polymeric material, wherein an interface is formed by opposing surfaces of the first lens structure and the second lens structure, the opposing surfaces having no air gap therebetween, at least one aperture disposed between the first lens structure and the second lens structure, wherein the aperture contacts the first lens structure and the second lens structure and wherein a supporting substrate is not positioned between the first lens structure and the second lens structure, and a spacer coupled to and separate from the wafer level lens.

18 Claims, 7 Drawing Sheets

(56) References Cited

U.S. PATENT DOCUMENTS

| | | |
|---|---|---|
| 2007/0091472 A1 | 4/2007 | Alkemper et al. |
| 2007/0126912 A1 | 6/2007 | De Bruin et al. |
| 2008/0113273 A1 | 5/2008 | Jin et al. |
| 2008/0239512 A1 | 10/2008 | Ota et al. |
| 2009/0027777 A1 | 1/2009 | Kyoya |
| 2009/0190227 A1* | 7/2009 | Yu ................................ 359/619 |
| 2009/0316273 A1 | 12/2009 | Viens |
| 2011/0222171 A1* | 9/2011 | Kintz et al. ................... 359/738 |

OTHER PUBLICATIONS

PCT International Search Report and Written Opinion dated Oct. 14, 2010 for PCT/US2010/040907.

Tisse, et al., Low-Cost Miniature Wide-Angle Imaging for Self=Motion Estimation, Optics, Express, vol. 13, No. 16, pp. 6061-6072, 2005.

* cited by examiner

Fig. 1

PRIOR ART

WAFER LEVEL OPTICAL ELEMENTS AND APPLICATIONS THEREOF

RELATED APPLICATIONS

This application is a continuation of, claims priority to, and incorporates by reference in full, the following co-pending application: U.S. patent application Ser. No. 12/497,441, filed Jul. 2, 2009, entitled "Wafer Level Optical Elements and Applications Thereof," the entirety of which is incorporated herein by reference, now U.S. Pat. No. 8,422,138 issued Apr. 16, 2013.

FIELD OF THE INVENTION

The present invention relates to optical elements and, in particular, to optical elements having lens structures fabricated at the wafer level.

BACKGROUND OF THE INVENTION

Wafer level fabrication techniques provide for the efficient and high volume production of optical elements and other components used in optical imaging apparatus. Existing wafer level fabrication techniques for optical elements employ a transparent substrate wafer onto which optical structures, such as lenses, are formed. The transparent substrate wafer provides mechanical rigidity to the optical elements, thereby facilitating downstream handling and processing. Moreover, transparent wafer substrates provide surfaces for the installation of one or more apertures for controlling the transmission of the desired amount of electromagnetic radiation to or from other optical components or sensing components of an optical system.

Figure 1:
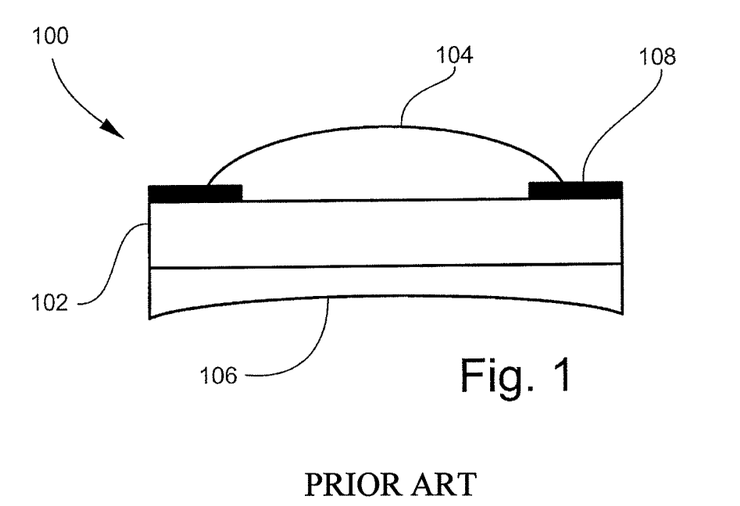
FIG. 1 illustrates a prior optical element comprising a wafer substrate between lens structures of the element.

FIG. 1 illustrates a wafer level optical element employing a substrate. The optical element (100) of FIG. 1 consists of a substrate (102), a first lens structure (104) deposited on a surface of the substrate (102) and a second lens structure (106) deposited on the opposing side of the substrate (102). An aperture (108) for the optical element (100) is additionally formed on a surface of the substrate (102).

The use of transparent substrate wafers, however, does present several disadvantages. One disadvantage is a reduction in modulation transfer function (MTF) values when a transparent substrate is disposed between lens structures. Moreover, substrate wafers can place design and/or mechanical restraints on optical structures deposited on the wafers. Substrate wafers, for example, can restrain the minimum center thickness of the optical element. Also, substrate wafers may behave differently over temperature fluctuations than the lens structures. Furthermore, substrate wafers contribute a significant amount to the cost of producing optical elements.

SUMMARY

In one aspect, the present invention provides wafer level optical elements that obviate a supporting substrate such as substrate wafer or a portion thereof disposed between optical structures or optical surfaces of the element. Moreover, in another aspect, the present invention provides a wafer level optical element comprising one or more apertures within the optical element, wherein the optical element does not comprise a wafer substrate or a portion thereof disposed between optical structures or optical surfaces of the element.

A wafer level optical element without a supporting substrate between optical structures or surfaces of the element can offer several advantages, including enhancing the optical performance of the element. Wafer level optical elements without a substrate between optical structures or surfaces, for example, can demonstrate reduced center thicknesses and improved MTF values. Moreover, substrate warping as a result of depositing optical structures or surfaces on the substrate is precluded with the elimination of the substrate from the construction of the optical element.

In one embodiment, an optical element of the present invention comprises a wafer level lens comprising a first lens structure coupled to a second lens structure, wherein an interface is present between the first lens structure and the second lens structure. Moreover, in coupling first and second lens structures, a wafer level lens of the present invention does not comprise a supporting substrate wafer positioned between the first lens structure and the second lens structure. In some embodiments, the interface present between the first lens structure and the second lens structure comprises an optically active surface.

The first and second lens structures of wafer level lenses can comprise any material not inconsistent with the objectives of the present invention. In some embodiments, the first and second lens structures comprise polymeric materials, glass materials or combinations thereof. Moreover, in some embodiments, the first and second lens structures comprise the same material. In other embodiments, the first and second lens structure comprise different materials.

In another embodiment, an optical element comprising a wafer level lens comprising a first lens structure coupled to a second lens structure further comprises at least one aperture disposed between the first lens structure and the second lens structure. In being disposed between the first and second lens structures, the at least one aperture, in some embodiments, is embedded in the wafer level lens.

Moreover, as a wafer level lens does not comprise a wafer substrate according to embodiments of the present invention, the at least one aperture within the lens is not associated with a wafer substrate. In some embodiments, one or more apertures of a wafer level lens are associated with the first lens structure. In other embodiments, one or more apertures of a wafer level lens are associated with the second lens structure. In another embodiment, one or more apertures are associated with both the first lens structure and the second lens structure.

An aperture, in some embodiments, can be positioned at any desired location in the wafer level lens. In some embodiments, an aperture is placed at an interface between the first lens structure and the second lens structure.

Additionally, in some embodiments, an optical element comprising a wafer level lens further comprises one or more baffles operable to reduce amounts of stray light entering the wafer level lens. In some embodiments, an optical element comprising a wafer level lens further comprises at least one spacer coupled to the wafer level lens. A spacer, in some embodiments, can provide the optical element increased rigidity, thereby facilitating downstream handling and processing. In some embodiments, for example, a spacer can facilitate stacking or coupling of the optical element comprising the wafer level lens with other optical components or sensing components.

In some embodiments, individual components of an optical element, including the first and second lens structures have the same or substantially the same coefficient of thermal expansion (CTE). In addition, one or more of the aperture, baffles and a spacer may have the same or substantially the same coefficient of thermal expansion (CTE) as the first or second lens structures. Glass substrates commonly used for support in the constructions of wafer level optical elements may have a CTE of about 1-6 ppm/degree C. In contrast polymeric materials used to foam lens structures on the supporting glass substrates may have a CTE greater than 10 ppm/degree C. and often between 18-100 ppm/degree C.

In another aspect, the present invention includes methods of producing a plurality optical elements by wafer level techniques. In one embodiment, a method of producing a plurality of optical elements comprises providing a first wafer comprising a plurality of first lens structures, providing a second wafer comprising a plurality of second lens structures and coupling the first wafer and the second wafer, wherein an interface is formed between the first lens structures and the second lens structures.

When coupled, the plurality of first lens structures achieve the desired alignment with the plurality of second lens structures to provide a plurality of joined optical elements comprising wafer level lenses. In coupling the first lens wafer and the second lens wafer, methods of the present invention do not utilize a substrate wafer disposed between lens structures of the first wafer and the second wafer.

In some embodiments, a method of producing a plurality of optical elements further comprises disposing a plurality apertures between the first wafer and the second wafer. Moreover, in some embodiments, a method of producing a plurality of optical elements further comprises singulating the plurality of joined optical elements to provide a plurality of individual optical elements.

These and other embodiments are described in greater detail in the detailed description which follows.

DETAILED DESCRIPTION

The present invention can be understood more readily by reference to the following detailed description, examples and drawings and their previous and following descriptions. Elements, apparatus and methods of the present invention, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

In one aspect, the present invention provides wafer level optical elements which do not incorporate a substrate wafer between optical structures or optical surfaces of the element. In another aspect, the present invention provides a wafer level optical element comprising one or more apertures within the optical element, wherein the optical element does not comprise a supporting substrate disposed between optical structures or optical surfaces of the element. In another aspect, the present invention provides a wafer level optical element that incorporates a non-supporting substrate between optical structures or optical surfaces of the element. In some embodiments, a non-supporting substrate is substantially CTE matched to optical structures or optical surfaces of the element.

In one embodiment, an optical element of the present invention comprises a wafer level lens comprising a first lens structure coupled to a second lens structure, wherein an interface is present between the first lens structure and the second lens structure. Moreover, in coupling the first lens structure and the second lens structure, a wafer level lens of the present invention does not comprise a substrate wafer or a portion thereof between the first lens structure and the second lens structure. In some embodiments, the interface present between the first lens structure and the second lens structure comprises an optically active surface. As used herein, a surface is optically active if the surface represents an interface between two media, such as between air and polymer, that is used to reflect, refract or diffract light.

Figure 2:
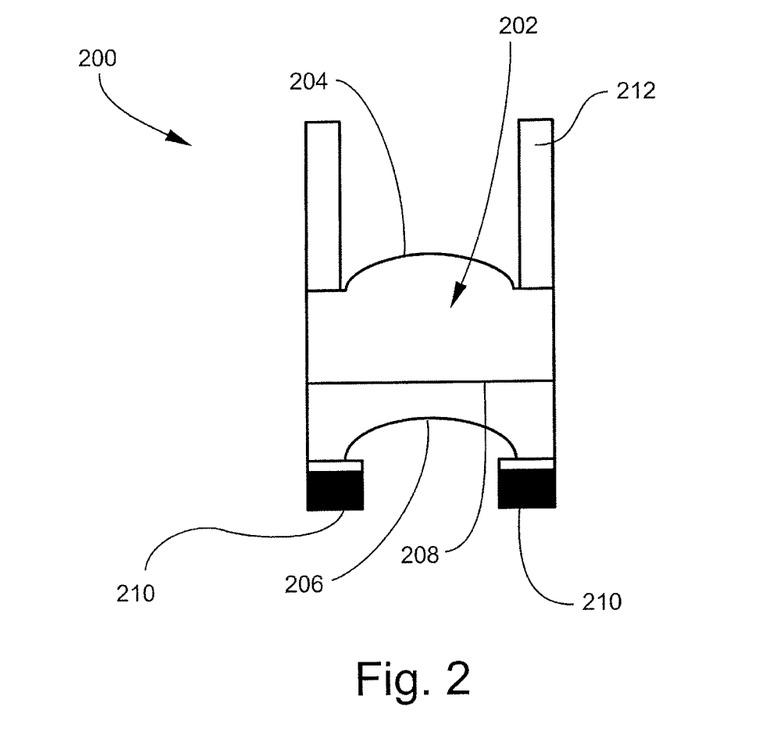
FIG. 2 illustrates an optical element according to one embodiment of the present invention.

Referring now to the figures, FIG. 2 illustrates an optical element according to one embodiment of the present invention. As illustrated in FIG. 2, the optical element (200) comprises a wafer level lens (202) comprising a first lens structure (204) coupled to a second lens structure (206). As the first lens structure (204) and the second lens structure (206) are coupled to one another, an interface (208) can exist between the first lens structure (204) and the second lens structure (206). Additionally, in contrast to the optical element illustrated in FIG. 1, the optical element (200) of FIG. 2 does not comprise a supporting substrate wafer or a portion thereof between the first lens structure (204) and the second lens structure (206).

In some embodiments, an interface between the first lens structure and the second lens structure of an optical element of the present invention is formed by surfaces of the first and second lens structures. In other embodiments, a non-supporting material or substrate can be disposed between the first and second lens structures, wherein the non-supporting material provides an interface between the first and second lens structures. In some embodiments, a non-supporting material or substrate has a Young's modulus (E) of less than about 10 GPa. In another embodiment, a non-supporting material or substrate has a modulus (E) of less than about 5 GPa. In some embodiments, a non-supporting material or substrate has a modulus (E) of less than about 2 GPa.

The optical element (200) further comprises baffle structures (210) operable to reduce amounts of stray light entering the wafer level lens (202). Moreover, the optical element (200) further comprises a spacer (212). As provided herein, a spacer (212), in some embodiments, facilitates stacking or coupling of the optical element (200) with other optical components or electromagnetic radiation sensing components of an optical system. A spacer (212), in some embodiments, provides mechanical support to the optical element (200) including the wafer level lens (202).

Figure 3:
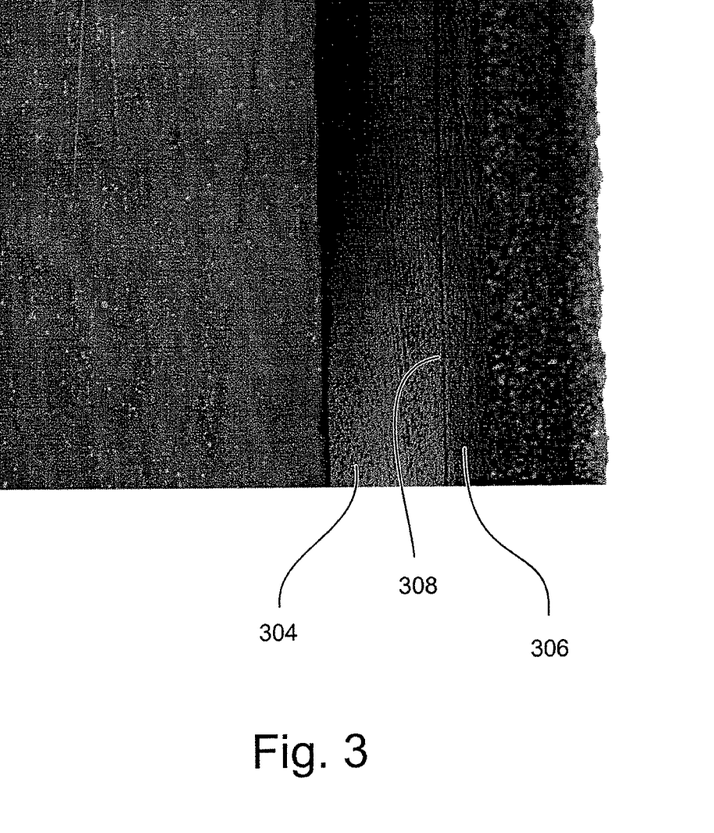
FIG. 3 illustrates an interface present between the first lens structure and the second lens structure of an optical element according to one embodiment of the present invention.

FIG. 3 illustrates an interface present between the first lens structure and the second lens structure of an optical element according to one embodiment of the present invention. As illustrated in FIG. 3, the first lens structure (304) is coupled to the second lens structure (306) such than an interface (308) is formed by surfaces of the first lens structure (304) and the second lens structure (306). In the embodiment illustrated in FIG. 3, the interface (308) is planar. In other embodiments, however, the interface can have any desired shape including curved shapes, stepped shapes, prismatic shapes or combinations thereof. In some embodiments, the interface comprises an optically active surface.

Figure 4:
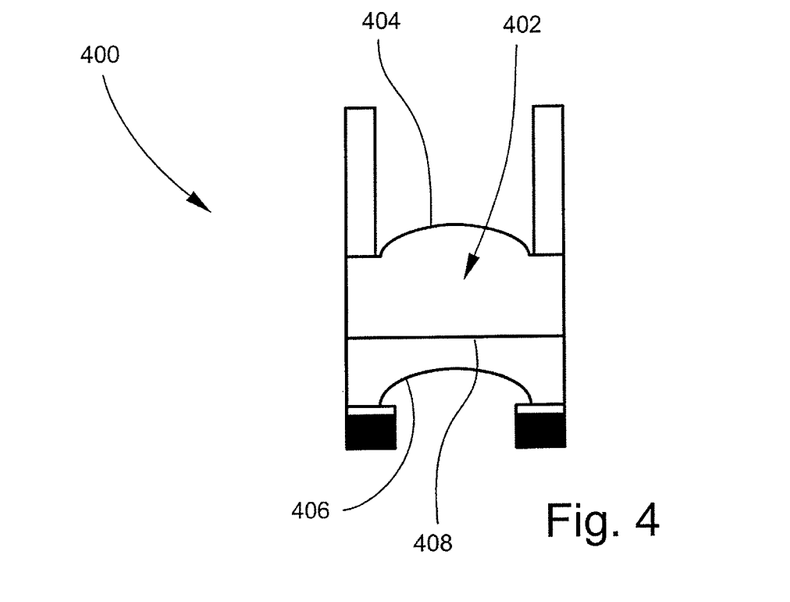
FIG. 4 illustrates an optical element according to one embodiment of the present invention.

FIG. 4 illustrates an optical element wherein the interface between the first lens structure and the second lens structure is not planar according to one embodiment of the present invention. The optical element (400) of FIG. 4 comprises a wafer level lens (402) comprising a first lens structure (404) coupled to a second lens structure (406). Coupling of the first lens structure (404) to the second lens structure (406) creates an interface (408) between surfaces of the first lens structure (404) and the second lens structure (406). The interface (408) illustrated in the embodiment of FIG. 4 is curved. In being curved, the interface (408) in FIG. 4 comprises an optically active surface if the materials used to form the first lens structure (404) and the second lens structure (406) are optically different.

In another embodiment, an optical element comprising a first lens structure coupled to a second lens structure further comprises at least one aperture disposed between the first lens structure and the second lens structure. In being disposed between the first lens structure and the second lens structure, the at least one aperture, in some embodiments, is embedded in the wafer level lens.

Additionally, as a wafer level lens does not comprise a supporting wafer substrate, according to embodiments of the present invention, the at least one aperture within the lens is not associated with a wafer substrate. In some embodiments, one or more apertures within a wafer level lens are associated with the first lens structure. In other embodiments, one or more apertures in a wafer level lens are associated with the second lens structure. In some embodiments, one or more apertures in a wafer level lens are associated with the first lens structure and the second lens structure.

An aperture in some embodiments, can be positioned at any desired location in the wafer level lens. In some embodiments, for example, an aperture is placed at an interface between the first lens structure and the second lens structure.

Figure 5:
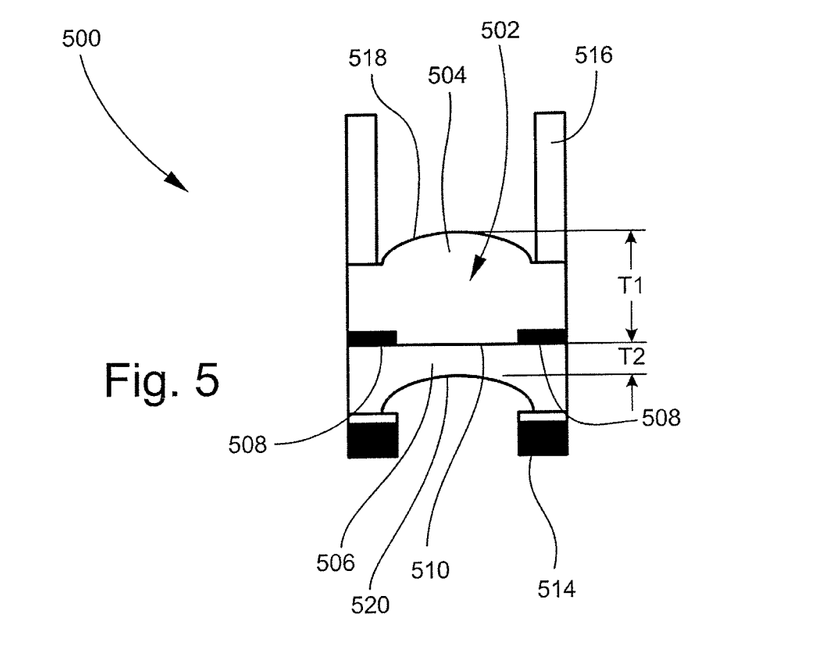
FIG. 5 illustrates an optical element according to one embodiment of the present invention.

Referring once again to the figures, FIG. 5 illustrates an optical element according to one embodiment of the present invention. The optical element (500) illustrated in FIG. 5 comprises a wafer level lens (502) comprising a first lens structure (504) coupled to a second lens structure (506). An aperture (508) is positioned within the wafer level lens (502) at the interface (510) of the first lens structure (504) and the second lens structure (506). The aperture (508) is embedded in the wafer level lens (502). Moreover, in being positioned at the interface of the first lens structure (504) and the second lens structure (506), the aperture (508) is not associated with a supporting substrate wafer as provided in FIG. 1.

Furthermore, since the first lens structure (504) and second lens structure (506) may be formed independent of each other, the relative position of the interface (510) and aperture (508) can be controlled. That is, the aperture (508) may be positioned closer to the first optically active surface (518) of the first lens structure (504) or to the second optically active surface (520) of the second lens structure (506). In the embodiment shown in FIG. 5, the aperture (508) is positioned a distance T1 from the first optically active surface (518) and a distance T2 from the second optically active surface (520). Depending on the desired optical performance, embodiments of the optical element (500) may be characterized by T1 being equal to T2, greater than T2, or less than T2.

The optical element (500) of FIG. 5 further comprises baffle structures (514) operable to reduce amounts of stray light entering the wafer level lens (502). The optical element (500) also comprises a spacer (516). As provided herein, a spacer (516), in some embodiments, facilitates stacking or coupling of the optical element (500) with other optical components or electromagnetic radiation sensing components. A spacer (516), in some embodiments, provides mechanical support to the optical element (500) including the wafer level lens (502).

Figure 13:
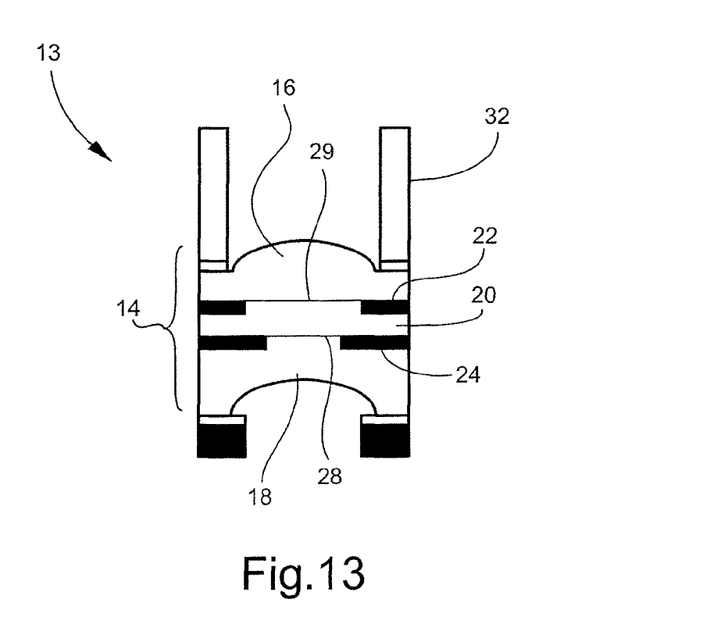
FIG. 13 illustrates an optical element according to one embodiment of the present invention.

FIG. 13 illustrates an optical element according to one embodiment of the present invention. The optical element (13) illustrated in FIG. 13 comprises a wafer level lens (14) comprising a first lens structure (16) and a second lens structure (18). A non-supporting material (20) is disposed between the first lens structure (16) and the second lens structure (18). The optical element (13) comprises a plurality of apertures (22, 24) disposed between the first lens structure (16) and the second lens structure (18). Aperture (22) is positioned or embedded within the wafer level lens (14) at the interface (29) of the first lens structure (16) and non-supporting material (20). Moreover, aperture (24) is positioned or embedded in the wafer level lens (14) at the interface (28) of the second lens structure (18) and the non-supporting material (20). In the embodiment illustrated in FIG. 13, apertures (22, 24) have different dimensions.

The optical element (13) further comprises baffle structures (30) operable to reduce amount of stray light entering the wafer level lens (14). The optical element (13) also comprises a spacer (32). As provided herein, a spacer (32), in some embodiments, facilitates stacking or coupling the optical element (13) with other optical components or electromagnetic radiation sensing elements. A spacer (32), in some embodiments, provided mechanical support to the optical element (13) including the wafer level lens (14).

Turning now to components of optical elements of the present invention, optical elements of the present invention comprise a wafer level lens comprising a first lens structure coupled to a second lens structure.

The first lens structure comprises an optical surface of any desired profile. In some embodiments, the first lens structure comprises an optical surface having a convex profile. In other embodiments, the first lens structure comprises an optical surface having a concave profile. In another embodiment, the first lens structure comprises an optical surface having a planar profile. The first lens structure, in some embodiments, comprises an optical surface comprising a plurality of shapes, including, for example, spherical, aspherical or partially concave and/or partially convex.

Moreover, the second lens structure comprises an optical surface of any desired profile. In some embodiments, the second lens structure comprises an optical surface having a convex profile. In other embodiments, the second lens structure comprises an optical surface having a concave profile or a planar profile. The second lens structure, in some embodiments, comprises an optical surface comprising a plurality of shapes, including, for example, spherical, aspherical or partially concave and/or partially convex.

Together, the first and second lens structures may form a wafer level lens having any of a variety of shapes, including, for example, meniscus, biconvex or biconcave shapes and thereby create a lens with positive power, negative power or a combination thereof.

The first and second lens structures can comprise any material not inconsistent with the objectives of the present invention. In some embodiments, the first and second lens structures comprise polymeric materials. Polymeric materials suitable for forming lens structures of the present invention, in some embodiments, comprise epoxides, oxetanes or acrylates such as polyacrylic acid, polymethacrylic acid, polymethylmethacrlyate or combinations thereof. In some embodiments, suitable polymeric materials for lens structures comprise maleate esters, thiol-ene polymers, or vinylethers. Suitable lens structure polymeric materials, in another embodiment, comprise perfluorocyclobutane (PFBC) containing polymers, such as perfluorocyclobutane poly(arylether)s. In some embodiments, suitable polymeric materials for lens structures can comprise copolymers of two or more of the foregoing polymeric species.

In some embodiments, the first and second lens structures comprise glass materials. A suitable glass material may comprise spin-on glass or molded glass, for example.

The first and second lens structures, in some embodiments, comprise the same material. In one embodiment, for example, the first and second lens structures comprise the same polymeric material. In other embodiments, the first and second lens structures comprise different materials. In one embodiment, for example, the first lens structure comprises a polymeric material different from the second lens structure. In another embodiment, the first lens structure comprises a polymeric material and the second lens structure comprises a glass material. In some embodiments, the first lens structure comprises a glass material and the second lens structure comprises a polymeric material.

The first lens structure and the second lens structure can have any desired thicknesses not inconsistent with the objectives of the present invention. In one embodiment, the first and second lens structures have a thickness ranging from about 50 µm to about 2000 µm. In some embodiments, reduced thicknesses may be available for very small camera or other non-imaging solutions. Additionally, in some embodiments, increased thicknesses of the first and/or second lens structures may be appropriate for larger cameras or other non-imaging solutions.

As provided herein, in some embodiments, an optical element of the present invention further comprises at least one aperture disposed between the first lens structure and the second lens structure. The at least one aperture can be delineated by any material operable to block or reduce the transmission of electromagnetic radiation of the desired wavelength or range of wavelengths. In some embodiments, the at least one aperture is delineated by a material operable to block or reduce the transmission of ultraviolet radiation, visible radiation or infrared radiation or combinations thereof. In some embodiments, a material delineating the at least one aperture reflects electromagnetic radiation. In other embodiments, a material delineating the at least one aperture absorbs electromagnetic radiation.

In some embodiments, a material delineating the at least one aperture comprises a metal. Metals can comprise elementally pure metals or alloys thereof. In some embodiments, metals comprise transition metals, aluminum or combinations thereof. A metal, in some embodiments, comprises a metal film.

In other embodiments, a material delineating the at least one aperture comprises one or more polymeric materials, such as a photolithographic resist resin. In some embodiments, a photolithographic resist comprises a positive resist or a negative resist. A photolithographic resist, in some embodiments, comprises a chemically amplified resist. In another embodiment, a material delineating the least one aperture comprises a combination of one or more polymeric materials and one or more metals.

A material delineating the at least one aperture has a thickness sufficient to block the transmission of radiation of the desired wavelength or range of wavelengths. In some embodiments, the material has a thickness ranging from about 10 nm to about 0.5 mm. In another embodiment, the material has a thickness ranging from about 250 µm to about 750 µm. The material, in some embodiments, has a thickness ranging from about 300 µm to about 500 µm.

In being disposed between the first lens structure and the second lens structure, the at least one aperture, in some embodiments, is embedded in the wafer level lens and is operable to control the amount of light passing through the wafer level lens. The at least one aperture can be tailored to provide have any desired dimension. The size of the aperture can vary depending on a number of factors, including, for example, the size of the lenses fondled, the desired optical performance, desired F/14, or size of the application. As an example, an aperture for use with a lens that images onto a VGA sensor having 2.2 µm pixels may have a diameter of around 0.5 to 1.0 mm.

In some embodiments, an optical element of the present invention comprises at least one spacer. The at least one spacer, in some embodiments, is coupled to the wafer level lens. A spacer, in some embodiments, can provide the optical element increased rigidity, thereby facilitating downstream handling and processing of the optical element. In some embodiments, for example, a spacer can facilitate stacking or coupling of the optical element comprising the wafer level lens with other optical components or an electromagnetic radiation sensing component.

In one embodiment, a spacer of an optical element is constructed of polymeric materials, including, for example, polyimides or liquid crystal polymers characterized by a coefficient of thermal expansion (CTE) greater than about 11-12 ppm/degree C. In one embodiment, the spacer comprises a glass fiber reinforced polymeric resin. In some embodiments, a glass fiber reinforced polymeric resin comprises FR-4. Certain formations of FR-4 are provided with different CTE in different directions. For example, in one embodiment, the spacer material is characterized by relatively large coefficient of thermal expansion in a first direction and a substantially smaller coefficient of thermal expansion in a second substantially orthogonal direction. This difference in CTE may be as large as an order of magnitude (e.g., about 175 ppm/degree C. versus about 14 ppm/degree C. in orthogonal directions). In such cases, the spacer material may be oriented so that the least amount of thermal expansion occurs in a direction substantially parallel to the wafer level lens of the optical element. A correspondingly larger thermal expansion will thus occur along the optical axis of the element. This particular configuration may help minimize stress at the adhesive junctions over temperature changes.

An optical element comprising a wafer level lens, in some embodiments, further comprises one or more baffle structures operable to reduce the amount of stray light entering the wafer level lens. In some embodiments, baffle structures are coupled to the wafer level lens. Baffle structures can have any desired dimensions not inconsistent with the objectives of the present invention.

Baffle structures can comprise any material operable to block or reduce the transmission of electromagnetic radiation of any desired wavelength or range of wavelengths. In some embodiments, baffle structures comprise a material operable to block or reduce the transmission of ultraviolet radiation, visible radiation or infrared radiation or combinations thereof. In some embodiments, baffle structures comprise a polymeric material. In other embodiments, baffle structures comprise a metal or alloy.

In some embodiments, individual components of an optical element of the present invention, including the first and second lens structures, aperture(s), baffles and a spacer have the same or substantially the same coefficient of thermal expansion (CTE). In other embodiments, any combination of individual components of an optical element have the same or substantially the same coefficient of thermal expansion.

An optical element of the present invention comprising a wafer level lens structure, in some embodiments, can be used in camera module applications including, but not limited to, camera modules for cellular phones. In some embodiments, optical elements of the present invention can be used in various surveillance applications and equipment requiring miniaturization of optical components such as mobile computing devices, automobiles, security, consumer electronics, toys and the like.

In another aspect, the present invention provides methods of producing a plurality of optical elements comprising a wafer level lens comprising a first lens structure coupled to a second lens structure. As an optical element of the present invention does not comprise a supporting substrate between the first and second lens structures, methods of the present invention, in some embodiments, do not use substrate wafers.

In one embodiment, a method of producing a plurality of optical elements comprises providing a first wafer comprising a plurality of first lens structures, providing a second wafer comprising a plurality of second lens structures and coupling the first wafer to the second wafer, wherein an interface is formed between the first lens structures and the second lens structures. When coupled, the plurality of first lens structures and the plurality of second lens structures achieve the desired alignment resulting in the production of a plurality of joined optical elements comprising wafer level lenses.

In some embodiments, providing a first wafer comprising a plurality of first lens structures comprises providing a first lens material and forming the first lens material into the first wafer comprising the plurality of first lens structures. Moreover, in some embodiments, providing a second wafer comprising a plurality of second lens structures comprises providing a second lens material and forming the second lens material into the second wafer comprising the plurality of second lens structures. In some embodiments, forming the first lens material into the first wafer comprising the plurality of first lens structures comprises molding the first lens material into the plurality of first lens structures. In some embodiments, forming the second lens material into the second wafer comprising the plurality of second lens structures comprises molding the second lens material into the plurality of second lens structures.

In providing a first wafer, in some embodiments, the plurality of first lens structures are formed simultaneously or substantially simultaneously. In other embodiments, the plurality of first lens structures are formed serially or sequentially. In providing a second wafer, in some embodiments, the plurality of second lens structures are formed simultaneously or substantially simultaneously. In other embodiments, the plurality of second lens structures are formed serially or sequentially.

In some embodiments wherein the first and/or second lens materials are molded, molds suitable for molding the first and second lens materials into first and second wafers comprising lens structures can have any desired shape and/or dimensions. In some embodiments, a mold for producing a first wafer comprising a plurality of first lens structures has a shape and/or dimensions different from a mold for producing a second wafer comprising a plurality of second lens structures. The shape and/or dimensions of a mold are generally governed by the desired shape and/or dimensions of the lens structures of a wafer.

As provided herein, the first and second lens materials can comprise any materials not inconsistent with the objectives of the present invention. In some embodiments, the first and second lens materials can comprise any of the polymeric materials or glass materials described herein. Moreover, in some embodiments, the first lens material and the second lens material are the same. In other embodiments, the first lens material and the second lens material are different.

The first wafer comprising a plurality of first lens structures and the second wafer comprising a plurality of second lens structures can be coupled by a variety of methods. In one embodiment, the first wafer and the second wafer are coupled by forming the second wafer on a surface of the first wafer. In another embodiment, the first wafer and the second wafer are coupled by forming the first wafer on a surface of the second wafer.

In some embodiments, the first wafer and the second wafer are coupled by molding the second wafer on a surface of the first wafer. In another embodiment, the first wafer and the second wafer are coupled by molding the first wafer on a surface of the second wafer.

Additionally, in some embodiments, the first wafer and the second wafer are coupled by an adhesive or other non-rigid, non-crystalline or non-supporting material.

In some embodiments, a method of producing an optical element further comprises disposing a plurality of apertures between the first wafer comprising a plurality of first lens structures and the second wafer comprising a plurality of second lens structures.

Disposing a plurality of apertures between the first wafer and the second wafer, in some embodiments, comprises patterning a surface of the first wafer with a material such as a resist. In some embodiments, patterning comprises selectively depositing a material on a surface of the first wafer. In other embodiments, patterning comprises depositing a material on a surface of the first wafer and selectively etching areas of the deposited aperture material to provide apertures in the material. Etching in some embodiments, comprises chemical etching, radiative etching or combinations thereof.

Disposing a plurality of apertures between the first wafer and the second wafer, in some embodiments, comprises patterning a surface of the second wafer with a material such as a resist. In some embodiments, patterning comprises selectively depositing a material on a surface of the second wafer.

In other embodiments, patterning comprises depositing a material on a surface of the second wafer and selectively etching areas of the deposited aperture material to provide apertures in the material. Etching in some embodiments, comprises chemical etching, radiative etching or combinations thereof.

Moreover, in some embodiments, disposing a plurality of apertures between the first wafer and the second wafer comprises patterning a surface of the first wafer and patterning a surface of the second wafer with one or more aperture materials.

In some embodiments, a surface of the first wafer and/or the second wafer is patterned with an aperture material prior to coupling of the wafers. In other embodiments, a surface of the first and/or second wafer is patterned with an aperture material after coupling of the wafers.

In some embodiments, methods of producing a plurality of optical elements further comprises coupling a perforated wafer to the joined optical elements. A perforated wafer, in some embodiments, is coupled to the first wafer comprising the plurality of first lens structures. In other embodiments, a perforated wafer is coupled to the second wafer comprising the plurality of second lens structures. In another embodiment, a first perforated wafer is coupled to the first wafer and a second perforated wafer is coupled to the second wafer.

A perforated wafer can be coupled to the first or second wafer by any method known to one of skill in the art. In one embodiment, for example, a perforated wafer is coupled to the first or second wafer by an adhesive, such as an adhesive curable by exposure to ultraviolet light or heat, for example.

In some embodiments, a perforated wafer is a spacer wafer. In other embodiments, a perforated wafer is a baffle wafer.

As provided herein, coupling of the first wafer comprising a plurality of first lens structures with the second wafer comprising a plurality of second lens structures provides a plurality of joined optical elements comprising wafer level lenses. Methods of the present invention, in some embodiments, further comprise singulating the plurality of joined optical elements to provide a plurality of individual optical elements. Singulation of the joined optical elements can be achieved by dicing blades, lasers or any other suitable technique known to one of skill in the art.

Referring once again to the figures, FIGS. 6 through 12 demonstrate production of an optical element according to one non-limiting embodiment of the present invention.

Figure 6:
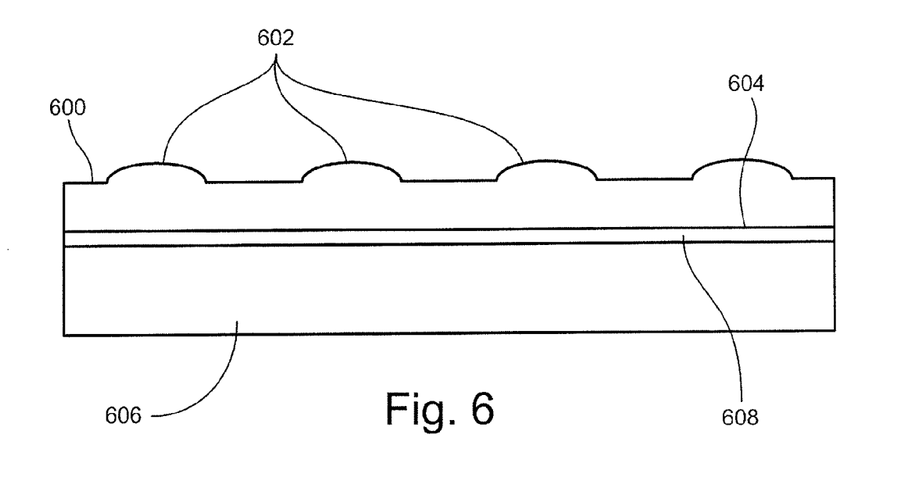
FIG. 6 illustrates a first wafer comprising a plurality of first lens structures according to one embodiment of the present invention.

FIG. 6 illustrates a first wafer comprising a plurality first lens structures according to one embodiment of the present invention. As illustrated in FIG. 6, the first wafer (600) comprises a plurality of molded first lens structures (602). In being molded, the first wafer (600) and the plurality of first lens structures (602) comprise a first polymeric material. The first wafer (600) comprises a surface (604) coupled to a rigid carrier substrate (606) for mechanical support to facilitate downstream processing into an optical element of the present invention. A release layer (608) is disposed between surface (604) of the first wafer (600) and the carrier (606) to permit removal of the first wafer (600) from the substrate (606) when desired. In one embodiment, the carrier (606) is transparent to permit exposure by UV light through the carrier (606) to cure the first wafer (600).

Figure 7:
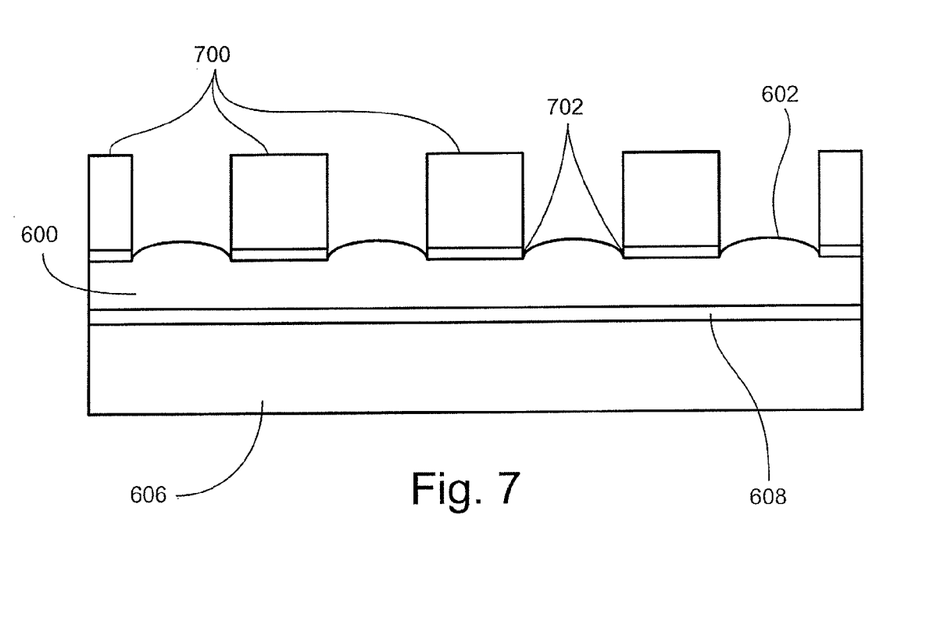
FIG. 7 illustrates a first wafer comprising a plurality of first lens structures, the wafer coupled to a perforated wafer according to one embodiment of the present invention.

A perforated wafer (700) is subsequently coupled to the first wafer (600) comprising the plurality of first lens structures (602) by an adhesive (702) as illustrated in the embodiment of FIG. 7. The adhesive (702) used to couple the perforated wafer (700) to the first wafer (600), in some embodiments, can be a radiation curable or a heat curable adhesive. In one embodiment, the transparent nature of the carrier (606) and the first wafer (600) permits curing of the adhesive (702) by providing radiation of the proper wavelength through the substrate (606) and the first wafer (600). In another embodiment, the adhesive (702) is cured via another catalyst (e.g., heat, time, or anaerobic). Consequently, the carrier (606) may be constructed of a non-transparent material.

Figure 8:
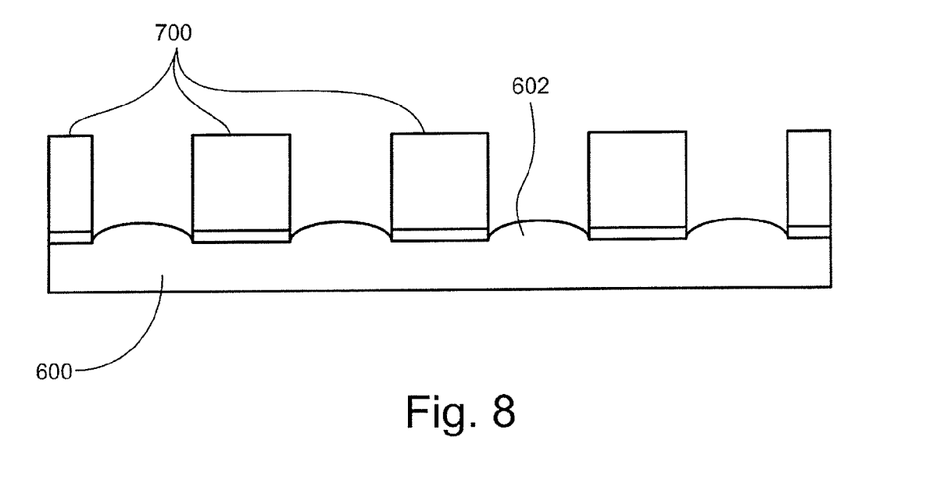
FIG. 8 illustrates a first wafer comprising a plurality of first lens structures, the wafer coupled to a perforated wafer according to one embodiment of the present invention.

As provided herein, the perforated wafer, in some embodiments, can be a spacer wafer and can provide mechanical support to an optical element and/or components thereof to facilitate downstream handling and processing. Therefore, once the perforated wafer (700) is coupled to the first wafer (600) comprising the plurality of first lens structures (602), the first wafer (600) can be removed from the carrier as illustrated in the embodiment of FIG. 8.

Figure 9:
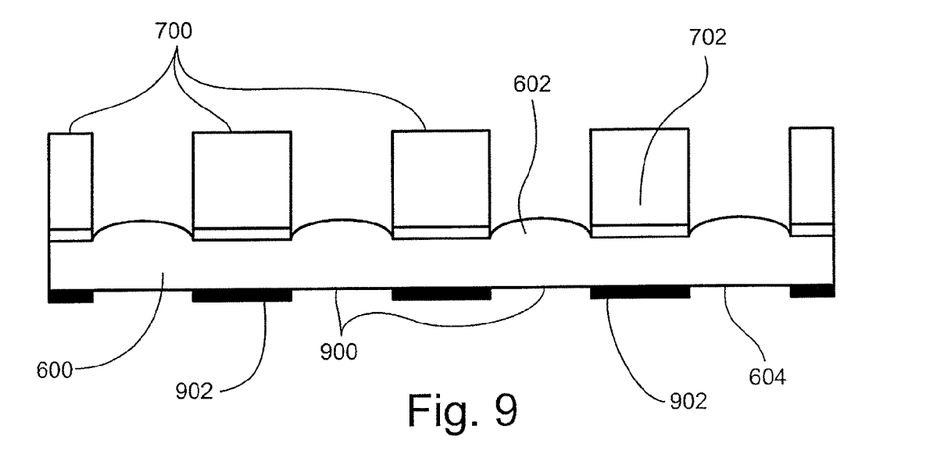
FIG. 9 illustrates a first wafer comprising a plurality of first lens structures, the wafer further comprising a plurality of optical apertures according to one embodiment of the present invention.

According to FIG. 9, a plurality of apertures (900) are subsequently patterned on the surface (604) of the first wafer (600) previously coupled to the carrier (606). The plurality of apertures (900) are delineated by a material (902) operable to block the transmission of radiation of the desired wavelength. The apertures (900) are operable to adjust the amount of light passing through the wafer level lens of an optical element of the present invention.

Figure 10:
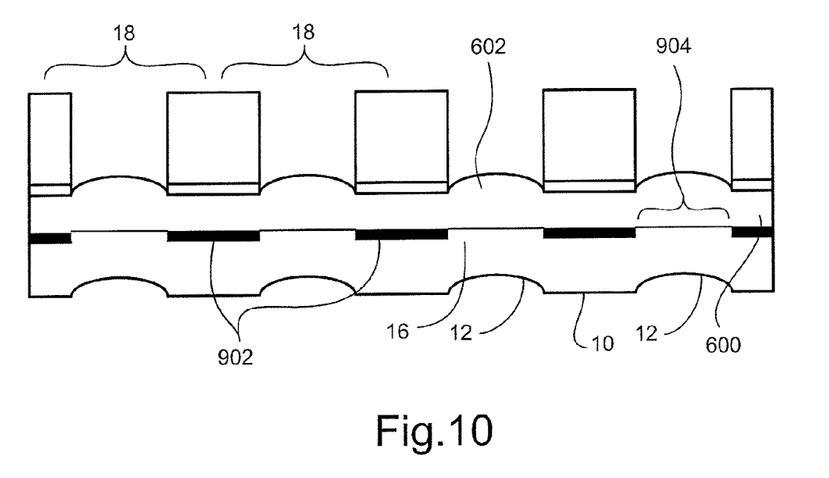
FIG. 10 illustrates a second wafer comprising a plurality of second lens structures coupled to a first wafer comprising a plurality of first lens structures to provide a plurality of joined optical elements according to one embodiment of the present invention.
Figure 11:
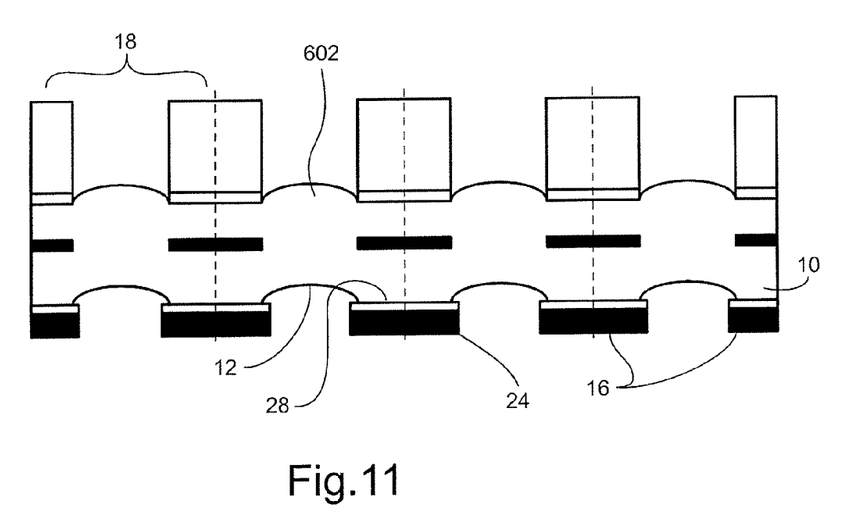
FIG. 11 illustrates a baffle wafer coupled to a plurality of joined optical elements according to one embodiment of the present invention.

FIG. 10 illustrates a second wafer comprising a plurality of second lens structures coupled to the first wafer (600) comprising the plurality of first lens structures (602) according to one embodiment of the present invention. As illustrated in FIG. 10, a second wafer (10) comprising a plurality of second lens structures (12) is coupled to a surface of the first wafer (600). As provided herein, the second wafer (10) can be formed onto a surface of the first wafer (600). Alternatively, the second wafer (10) can be coupled to the first wafer (600) by a non-supporting material such as an adhesive. In some embodiments, an interface (16) is formed between the first lens structures (602) and the second lens structures (12).

As illustrated in FIG. 10, coupling second wafer (10) comprising the plurality of second lens structures (12) to a surface (604) of the first wafer (600), provides a plurality of joined optical elements (18) having an aperture (904) embedded therein, the apertures delineated by material (902).

As described herein, in some embodiments, a second perforated wafer is coupled to the joined optical elements. In some embodiments, the second perforated wafer is a baffle wafer. In the embodiment illustrated in FIG. 11, a baffle wafer (24) is coupled to a surface (26) of the second wafer (10). The baffle wafer (24) can be coupled to the second wafer (10) by an adhesive (28), such as a radiation or heat curable adhesive. The baffle wafer (24) provides baffle structures to each of the optical elements (18) operable to reduce amounts of stray light entering the wafer level lens of each element formed by the first lens structure (602) and the second lens structure (12).

Figure 12:
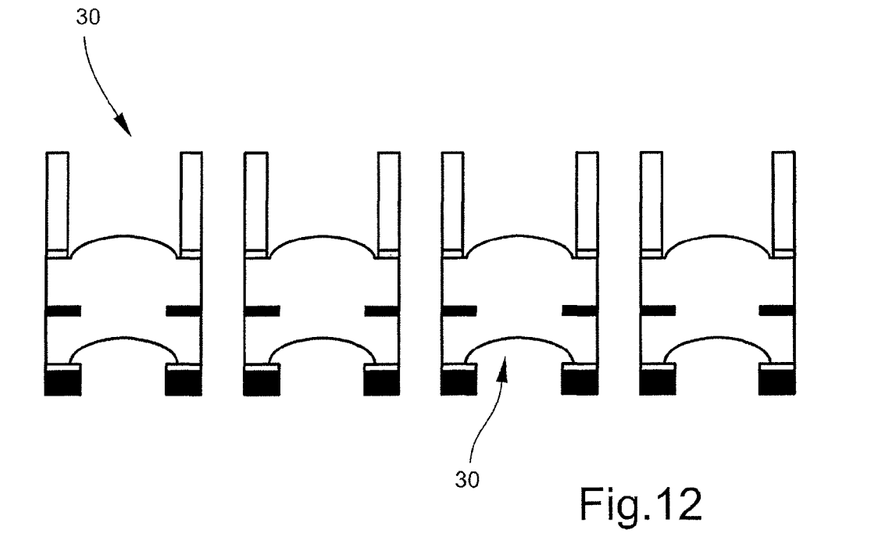
FIG. 12 illustrates a plurality of singulated optical elements according to one embodiment of the present invention.

Moreover, the plurality of joined optical elements can be singulated to provide a plurality of independent optical elements (30) as illustrated in FIG. 12.

Embodiments of the present invention a further illustrated in the following non-limiting examples.

Example 1

Plurality of Optical Elements

A plurality of optical elements of the present invention were fabricated according to the following procedure.

A temporary coating of polydimethylsiloxane (PDMS) was spun on temporary carrier wafer of fused silica glass at 2700 rpm followed by cure at 150° C. for 30 minutes. Optical polymer was replicated on the temporary PDMS coating to form a first wafer comprising a plurality of first lens structures. The polymer was UV-cured at 20 mW/cm² for 50 sec. A perforated substrate was subsequently bonded to the first wafer with thermal epoxy (353ND) at 90° C. for 1 h. Afterwards, the temporary carrier wafer was separated from the first wafer.

The perforated substrate having the first lens surface above each hole was baked at 150° C. for 3 h. A layer of Cr metal having a thickness of about 500 μm was deposited on the backside of the first wafer comprising the plurality of first lens structures using thermal evaporation equipment. Positive resist was spun on top of the deposited Cr metal at 3000 rpm followed by soft cure at 110° for 30 min. in convection oven. The photoresist was exposed to radiation through a mask having an aperture pattern with energy of about 100 mJ/cm². The wafer was developed in TMAH-like solution for 30 sec followed by metal etching to form the aperture openings in the resist. The remaining portion of the resist underwent blanket exposure to radiation at about 300 mJ/cm² followed by removal in the TMAH-like solution.

A second lens wafer comprising a plurality of second lens structures was replicated on the backside of the first wafer in such a way that both the first and second lens structures and the metal apertures were aligned accordingly to provide a plurality of joined optical elements. The second lens structures comprised the same optical polymer as the first lens structures. An interface was present between the first and second lens structures. The plurality of joined optical elements were cured at 150° C. for 3 h. The plurality of joined optical elements were singulated to individual optical elements by a dicing saw using a resin blade. The optics of the individual elements were tested to get the MTF and FFL values. After assembly into the socket the pictures were taken using the prepackaged VGA sensor.

Various embodiments have of the invention have been described in fulfillment of the various objects of the present invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. An optical element, comprising:
   a wafer level lens comprising a first lens structure of a first polymeric material coupled to a second lens structure of a second polymeric material, wherein a planar interface is formed by opposing surfaces of centers of the first lens structure and the second lens structure, the opposing surfaces having no air gap therebetween;
   at least one aperture disposed between the first lens structure and the second lens structure, wherein the at least one aperture contacts the first lens structure and the second lens structure and wherein a supporting substrate is not positioned between the first lens structure and the second lens structure, the at least one aperture having a first surface, orthogonal to a light transmission path of the optical element, that contacts the first polymeric material throughout the optical element, a second surface, opposite the first surface, that contacts the second polymeric material throughout the optical element, and a third surface, connecting the first and second surfaces, that contacts at least one of the first and second polymeric materials; and
   a spacer coupled to and separate from the wafer level lens.

2. The optical element of claim 1, wherein the first polymeric material of the first lens structure and the second polymeric material of the second lens structure are the same.

3. The optical element of claim 1, wherein the first polymeric material of the first lens structure and the second polymeric material of the second lens structure are different.

4. The optical element of claim 1, wherein the at least one aperture comprises a metal or a polymeric resist.

5. The optical element of claim 1 further comprising one or more baffle structures.

6. The optical element of claim 1, wherein the first lens structure and the second lens structure have substantially the same coefficient of thermal expansion (CTE).

7. The optical element of claim 1, wherein the first lens structure, second lens structure and spacer have substantially the same CTE.

8. The optical element of claim 1, wherein a non-supporting substrate is disposed between the opposing surfaces of the first lens structure and the second lens structure.

9. The optical element of claim 1, wherein the interface is non-planar.

10. The optical element of claim 1, wherein the spacer provides mechanical support to the wafer level lens.

11. The optical element of claim 1, wherein the first and second lens structures include first and second lens surfaces, respectively, on surfaces opposite the interface.

12. The optical element of claim 1, wherein, beneath the spacer, the aperture contacts the first polymeric material and the second polymeric material.

13. The optical element of claim 12, wherein the at least one aperture is surrounded on three sides by the first and second polymeric materials.

14. An optical element, comprising:
   a wafer level lens comprising a first lens structure of a first polymeric material coupled to a second lens structure of a second polymeric material, wherein planar interface is formed by opposing surfaces of centers of the first lens structure and the second lens structure; and
   at least one aperture disposed between the first lens structure and the second lens structure, wherein the at least one aperture has a first surface, orthogonal to a light transmission path of the optical element, that contacts a first material throughout the optical element, a second surface, opposite the first surface, that contacts a second material throughout the optical element, and a third surface, connecting the first and second surfaces, that contacts at least one of the first and second materials.

15. The optical element of claim 14, wherein the first material is the first polymeric material and the second material is the second polymeric material.

16. The optical element of claim 14, wherein the first material is the first polymeric material and the second material is a non-supporting material.

17. The optical element of claim 14, wherein the first material is a non-supporting material and the second material is the second polymeric material.

18. The optical element of claim 14, wherein the at least one aperture is surrounded on three sides by the first and second materials.

* * * * *